United States Patent
Tabata et al.

(10) Patent No.: US 7,823,720 B2
(45) Date of Patent: Nov. 2, 2010

(54) BELT TRANSPORT DEVICE AND BELT TRANSPORT CONTROL METHOD

(75) Inventors: Kunio Tabata, Shiojiri (JP); Toshiyuki Suzuki, Shiojiri (JP); Atsushi Oshima, Shiojiri (JP)

(73) Assignee: Seiko Epson Corporaton, Tokyo (JP)

( * ) Notice: Subject to any disclaimer, the term of this patent is extended or adjusted under 35 U.S.C. 154(b) by 0 days.

(21) Appl. No.: 12/396,238

(22) Filed: Mar. 2, 2009

(65) Prior Publication Data

US 2009/0219373 A1 Sep. 3, 2009

(30) Foreign Application Priority Data

Mar. 3, 2008 (JP) ............................. 2008-051708
Oct. 14, 2008 (JP) ............................. 2008-264867

(51) Int. Cl.
  *B65G 43/00* (2006.01)
  *B65G 39/16* (2006.01)
  *B41J 29/38* (2006.01)
  *G03G 15/00* (2006.01)

(52) U.S. Cl. .................... 198/810.03; 198/806; 347/16; 399/165

(58) Field of Classification Search .................. 347/16; 399/165; 198/810.03, 806

See application file for complete search history.

(56) References Cited

U.S. PATENT DOCUMENTS 5,153,655 A * 10/1992 Suzuki et al. ............... 399/329
2002/0034400 A1 * 3/2002 Asuwa et al. ............... 399/165
2008/0213009 A1 * 9/2008 Kamoshita et al. .......... 399/313

FOREIGN PATENT DOCUMENTS

| JP | 06-056294 | 3/1994 |
|---|---|---|
| JP | 06-127037 | 5/1994 |
| JP | 08-211693 | 8/1996 |
| JP | 2001-034025 | 2/2001 |
| JP | 2002-108130 | 4/2002 |
| JP | 2004-157152 | 6/2004 |
| JP | 2006-227005 | 8/2006 |
| JP | 2006-248082 | 9/2006 |
| JP | 2006-347039 | 12/2006 |
| JP | 2007-094128 | 4/2007 |
| JP | 2008-087962 | 4/2008 |

* cited by examiner

*Primary Examiner*—Matthew Luu
*Assistant Examiner*—Shelby Fidler
(74) *Attorney, Agent, or Firm*—Workman Nydegger

(57) ABSTRACT

A belt transport device includes: a drive roller which is driven by a power source; a driven roller which is held in a rotatable manner; an endless belt which is wound on the drive roller and the driven roller; a band-like detecting section which is arranged on the endless belt in a circumferential direction of the endless belt; a sensor which detects the band-like detecting section; a displacement unit which displaces a relative positional relationship between the band-like detecting section and the sensor in a width direction of the endless belt.

2 Claims, 7 Drawing Sheets

Tx=Ty (n=1)    Tx=1/2×Ty (n=1/2)    Tx=2×Ty (n=2)

BELT TRANSPORT DEVICE AND BELT TRANSPORT CONTROL METHOD

BACKGROUND

1. Technical Field

The present invention relates to a belt transport device including a drive roller which is driven by a power source, a driven roller which is held in a rotatable manner, an endless belt which is wound on the drive roller and the driven roller, a band-like detecting section which is arranged on the endless belt in a circumferential direction of the endless belt, and a sensor which detects the band-like detecting section, and a belt transport control method.

2. Related Art

In the past, as disclosed in JP-A-8-211693, JP-A-2006-248082 and Japanese Patent No. 3082452, belt transport devices had a drive roller, a driven roller and an endless belt. In addition, a detecting section was provided on the endless belt and a detector was provided at a position opposed to the detecting section. Accordingly, while the endless belt rotated in a circumferential direction of the belt, the detector was able to detect information such as positional information from the detecting section.

However, there is a possibility that the detector may trace the same point in the detecting section when the endless belt circulates.

For example, when the endless belt does not obliquely travel and circulates, the detector traces the same point in the detecting section in a width direction.

When a configuration for controlling the oblique traveling of the endless belt is employed and the endless belt circulates, there is a possibility that the detector may trace the same point in the detecting section in the width direction in accordance with an oblique traveling cycle of the endless belt.

FIGS. 7A to 7C are schematic diagrams illustrating a relationship between an oblique traveling cycle of an endless belt according to a related art and a revolution cycle of the endless belt.

As illustrated in FIGS. 7A to 7C, a detecting section 30 having a width W is provided over the whole area in a circumferential direction of the endless belt and over a part of the area in a width direction of the endless belt. When L is a length of one revolution of the endless belt, a relative positional relationship between a sensor 31 and the detecting section 30 provided on the endless belt is displaced by the oblique traveling of the endless belt.

Herein, as illustrated in FIG. 7A, when an oblique traveling cycle Tx of the endless belt is equal to a revolution cycle Ty of the endless belt, the sensor 31 always traces the same point in the detecting section 30.

Further, as illustrated in FIG. 7B, when a relationship between the oblique traveling cycle Tx of the endless belt and the revolution cycle Ty of the endless belt satisfies the expression Tx=½×Ty, the sensor 31 always traces the same point in the detecting section 30.

Furthermore, as illustrated in FIG. 7C, when a relationship between the oblique traveling cycle Tx of the endless belt and the revolution cycle Ty of the endless belt satisfies the expression Tx=2×Ty, the sensor 31 traces at least the same point in a central part of the width W. In addition, the sensor 31 traces the same point in the detecting section 30 for every two revolution of the endless belt.

Accordingly, when the sensor 31 is a contact sensor, only the same point in the detecting section 30 is worn and thus durability is deteriorated. Moreover, there is a possibility that an error may occur in detection as the wearing progresses.

Even when the sensor 31 is a non-contact sensor, there is a significantly increasing possibility that an error may occur in detection when foreign materials adhere to the same point in the detecting section 30.

SUMMARY

An advantage of some aspects of the invention is that it provides a belt transport device capable of stably detecting a band-like detecting section provided on an endless belt and a belt transport control method.

According to an aspect of the invention, a belt transport device includes: a drive roller which is driven by a power source; a driven roller which is held in a rotatable manner; an endless belt which is wound on the drive roller and the driven roller; a band-like detecting section which is arranged on the endless belt in a circumferential direction of the endless belt; a sensor which detects the band-like detecting section; a displacement unit which displaces a relative positional relationship between the band-like detecting section and the sensor in a width direction of the endless belt; and a controller which controls the displacement unit to displace the relative positional relationship so as to satisfy the expression $Tx \neq n \times Ty$ ($n= \ldots, \frac{1}{3}, \frac{1}{2}, 1$ and $2$) in the range in which the band-like detecting section and the sensor are opposed to each other, where Tx is an oblique traveling cycle of the endless belt and Ty is a revolution cycle of the endless belt.

Herein, n is a positive fraction not more than ½ or an integer of 1 or 2.

According to this aspect of the invention, the controller of the belt transport device controls the displacement unit to displace the relative positional relationship so as to satisfy the expression oblique traveling cycle $Tx \neq n \times$ revolution cycle Ty ($n= \ldots, \frac{1}{3}, \frac{1}{2}, 1$ and $2$) in the range in which the band-like detecting section and the sensor are opposed to each other. Accordingly, there is no possibility that the sensor traces the same point in the band-like detecting section while the endless belt circulates.

When the sensor is a contact sensor, it is possible to prevent the same point from being worn.

As a result, durability of the band-like detecting section can be improved. That is, the band-like detecting section provided on the endless belt can be stably detected.

When the sensor is a non-contact optical sensor, a possibility that an error may occur in detection by the adhesion of foreign materials such as dust to the band-like detecting section can be significantly reduced.

In the belt transport device according to this aspect of the invention, the displacement unit is a tiltable oblique traveling correction roller which corrects the oblique traveling of the endless belt by coming into contact with a face of the endless belt.

According to this aspect of the invention, the displacement unit is a tiltable oblique traveling correction roller which corrects the oblique traveling of the endless belt by coming into contact with a face of the endless belt. Accordingly, a so-called steering unit can be used for tilting of the oblique traveling correction roller. That is, a steering unit for correcting the oblique traveling of the endless belt can be used and there is no need to newly provide a dedicated unit.

In the belt transport device according to this aspect of the invention, the controller controls the displacement unit so as to displace the relative positional relationship by a distance equal to a width of the sensor for every revolution of the endless belt.

According to this aspect of the invention, the controller controls the displacement unit to displace the relative positional relationship by a distance equal to the width of the sensor for every revolution of the endless belt. Accordingly, a possibility that the sensor traces the same point in the band-like detecting section can be minimized. That is, there is no possibility that a certain point is intensively traced and another certain point is not traced. As a result, when the sensor is a contact sensor, highest durability of the band-like detecting section can be achieved. In addition, when the sensor is a non-contact sensor such as an optical sensor, a possibility that an error may occur in detection by the adhesion of foreign materials such as dust to the band-like detecting section can be made lowest.

In the belt transport device according to this aspect of the invention, the sensor is a magnetic sensor and the band-like detecting section is a magnetic recording layer.

According to this aspect of the invention, the sensor is a magnetic sensor and the band-like detecting section is a magnetic recording layer. When the sensor is a contact sensor, it is possible to prevent only a certain point in the band-like detecting section from being worn and thus durability can be improved. This is particularly effective in related cases.

A recording device includes a transport unit which holds and transports a recording medium and a recording unit which performs a recording operation on the transported recording medium and the transport unit is the belt transport device according to this aspect of the invention.

According to this aspect of the invention, the transport unit is the belt transport device. Accordingly, in the recording device, the same advantages as those described above can be obtained.

According to another aspect of the invention, a belt transport control method for determining an angle of an oblique traveling correction roller when a relative positional relationship between a band-like detecting section which is arranged on an endless belt in a circumferential direction of the endless belt and a sensor which detects the band-like detecting section is displaced in a width direction of the endless belt includes: obtaining first time from when the endless belt is positioned at a predetermined position in the width direction of the endless belt during the driving of a drive roller on which the endless belt is wound and the oblique traveling correction roller on which the endless belt is wound is tilted by a first arbitrary angle from a state of being not tilted until when a first detector which detects a position in the width direction of the endless belt detects the endless belt; obtaining second time from when the oblique traveling correction roller is tilted by a second arbitrary angle in the opposite direction to the direction of the oblique traveling correction roller tilted by the first arbitrary angle in the obtaining of the first time until when a second detector which detects a position in the width direction of the endless belt detects the endless belt after the obtaining of the first time; and calculating an angle of the oblique traveling correction roller which displaces the endless belt by a width of the sensor in the width direction for every revolution of the endless belt on the basis of the first time obtained in the obtaining of the first time, a first distance by which the endless belt moves in the width direction at the first time, the second time obtained in the obtaining of the second time, a width of the band-like detecting section that is a second distance by which the endless belt moves in the width direction at the second time, and the width of the sensor.

In the belt transport device according to this aspect of the invention, the same advantages as those described above can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an oblique traveling belt correction device according to the invention, a belt transport device including the oblique traveling belt correction device and a recording device including the belt transport device will be described. First, an ink jet printer 1 on which a belt transport device is mounted as a transport unit for recording mediums (hereinafter, referred to as "sheet") P will be employed as a best mode for putting a recording device of the invention into practice, and the whole configuration of the ink jet printer will be schematically described on the basis of the drawings.

Figure 1:
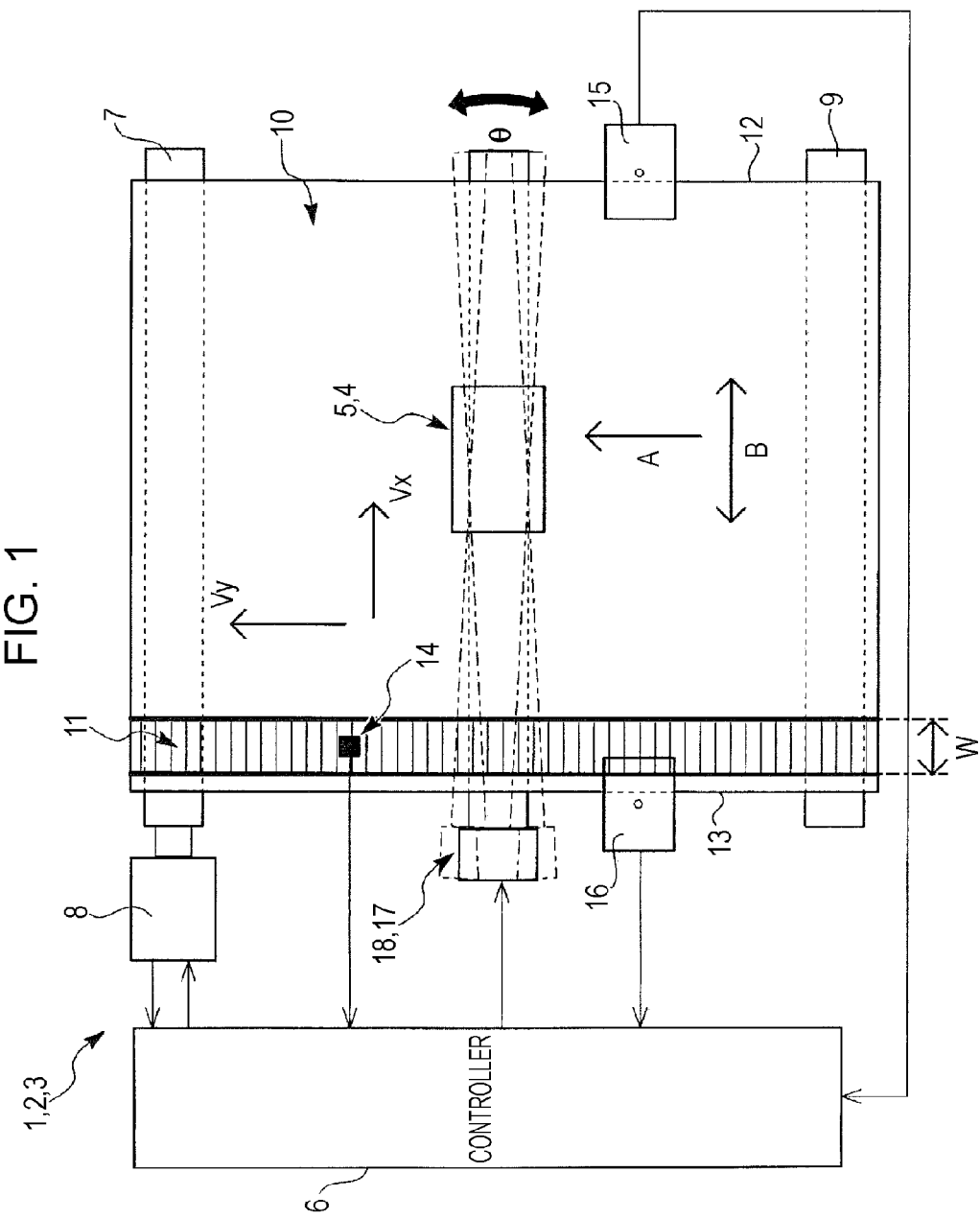
FIG. 1 is a plan view schematically illustrating a belt transport device according to the invention.
Figure 2:
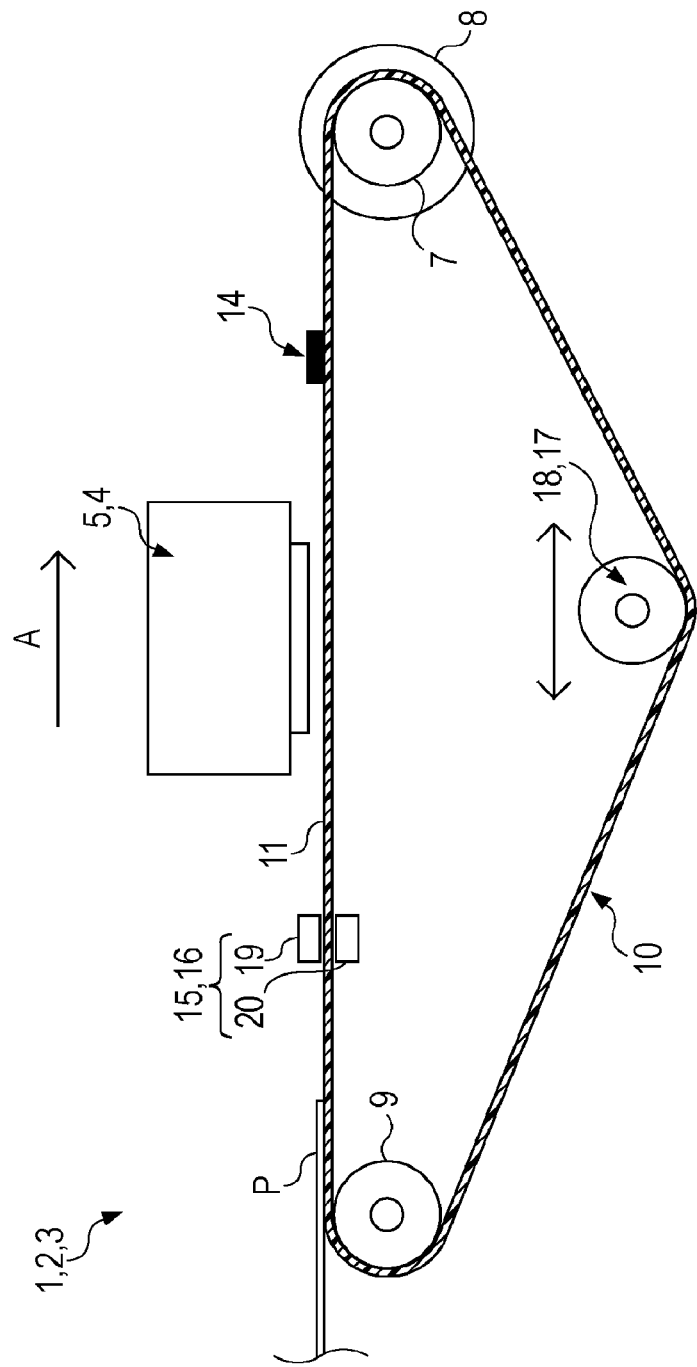
FIG. 2 is a sectional side view schematically illustrating the belt transport device according to the invention.

FIG. 1 is a plan view schematically illustrating the inner structure of the ink jet printer including the belt transport device to which the oblique traveling belt correction device of the invention is applied and FIG. 2 is a sectional side view schematically illustrating the belt transport device to which the oblique traveling belt correction device of the invention is applied.

The ink jet printer 1 has a printer body (not shown) as an example of a body for the recording device. In addition, the ink jet printer 1 is provided with a transport unit 2 which holds and transports a sheet P in the printer body and a recording unit 4 which performs a recording operation on the sheet P held and transported by the transport unit 2. In the ink jet printer 1 illustrated in the drawing, a belt transport device 3 is applied to the transport unit 2. The sheet P fed by a feeding unit (not shown) passes through a gate roller (not shown) composed of a pair of nip rollers to be supplied on the belt transport device 3.

The belt transport device 3 has a driven roller 9 which is disposed on the upstream side in a transport direction A, a drive roller 7 which is disposed on the downstream side in the transport direction A, and an oblique traveling correction roller 18 which is disposed below and between the driven roller 9 and the drive roller 7 and serves as a constituent member for an oblique traveling belt correction device 17. The belt transport device 3 has a basic configuration in which an endless belt 10 is wound in a loop shape on the three rollers 7, 9 and 18.

The driven roller 9 and the drive roller 7 are members with a straight pipe shape or a round bar shape and have the same diameter in an axial direction B. Among them, the drive roller 7 gives a transport force in the transport direction A to the endless belt 10 and its one end in the axial direction B is directly connected to, for example, a transport motor 8 which provides power to the drive roller 7. The driven roller 9 is disposed at the same height as the drive roller 7 and opposed to the drive roller 7 in a parallel manner with a certain interval therebetween. A transport face for the sheet P is formed between the drive roller 7 and the driven roller 9 so that the endless belt 10 is horizontally stretched in a state of being tensioned.

The endless belt 10 is an endless band-like member made of an elastic material such as synthetic rubber. The endless belt 10 has a number of holes (not shown) formed thereon. Through the holes, the sheet P is sucked and held by a suction device (not shown) so as to be sucked and held on the transport face of the endless belt 10.

Suction occurring by a negative pressure or electrostatic adsorption can be employed as an example of a suction method for the suction device.

The recording unit 4 has a recording head 5 as a main constituent member which performs a recording operation by ejecting inks of various colors on an upper face of the sheet P.

Further, as illustrated in FIG. 1, the oblique traveling belt correction device 17 is provided with two edge sensors, specifically, an ON/OFF switch type left edge sensor 16 and an ON/OFF switch type right edge sensor 15 together with the oblique traveling correction roller 18. The left edge sensor 16 and the right edge sensor 15 are provided to detect edge positions of right and left edges 12 and 13 in a width direction (coincident with axial direction B) of the endless belt 10.

When the endless belt 10 does not obliquely travel in normal times, the edge sensors 15 and 16 are in a state of OFF.

When the endless belt obliquely travels to the left, the left edge sensor 16 detects the left edge 13 and is switched to an ON state and the right edge sensor 15 is in an OFF state. On the other hand, when the endless belt obliquely travels to the right, the right edge sensor 15 detects the right edge 12 and is switched to an ON state and the left edge sensor 16 is in an OFF state. As the edge sensors 15 and 16, for example, a non-contact sensor such as an optical sensor having a light emitter 19 and a light receiver 20 is employed.

The oblique traveling belt correction device 17 is provided with a tilting mechanism (not shown) which tilts the oblique traveling correction roller 18 in a direction in which the oblique traveling of the endless belt 10 is corrected. The tilting mechanism (not shown) has a cam operation motor (not shown) which is a power driver as a power source and a conversion mechanism (not shown). Herein, the conversion mechanism is configured to convert the rotation driving of the cam operation motor (not shown) into the tilt of the oblique traveling correction roller 18 with a relationship in which a tilting amount of the oblique traveling correction roller 18 is determined in accordance with a rotation driving amount of the cam operation motor (not shown).

In this embodiment, an oscillating arm (not shown) and a tension spring (not shown) are provided to use the oblique traveling correction roller 18 as a tension roller.

Thanks to the above configurations, a controller 6 can detect the ON state of the right edge sensor 15 when the endless belt 10 obliquely travels to the right. Moreover, the controller 6 tilts the oblique traveling correction roller 18 to the left, so that the endless belt 10 is moved to the center. In this manner, the oblique traveling of the endless belt 10 can be corrected.

In the same manner, the controller 6 can detect the ON state of the left edge sensor 16 when the endless belt 10 obliquely travels to the left. Moreover, the controller 6 tilts the oblique traveling correction roller 18 to the right, so that the endless belt 10 is moved to the center. In this manner, the oblique traveling of the endless belt 10 can be corrected.

Near the left end in the width direction B of the surface of the endless belt 10, a magnetic recording layer 11 is provided over the entire circumference. Moreover, a magnetic sensor 14 is provided at a position opposed to the magnetic recording layer 11. Accordingly, the magnetic sensor 14 can read information recorded on the magnetic recording layer 11. Specifically, information on a position in a circumferential direction of the belt, which is recorded on the magnetic recording layer 11, can be read, and in this manner, the magnetic sensor 14 can function as an encoder.

In this embodiment, the magnetic sensor 14 is a fixed sensor. In FIG. 1, the reference sign Vy is a transport speed.

Figure 3:
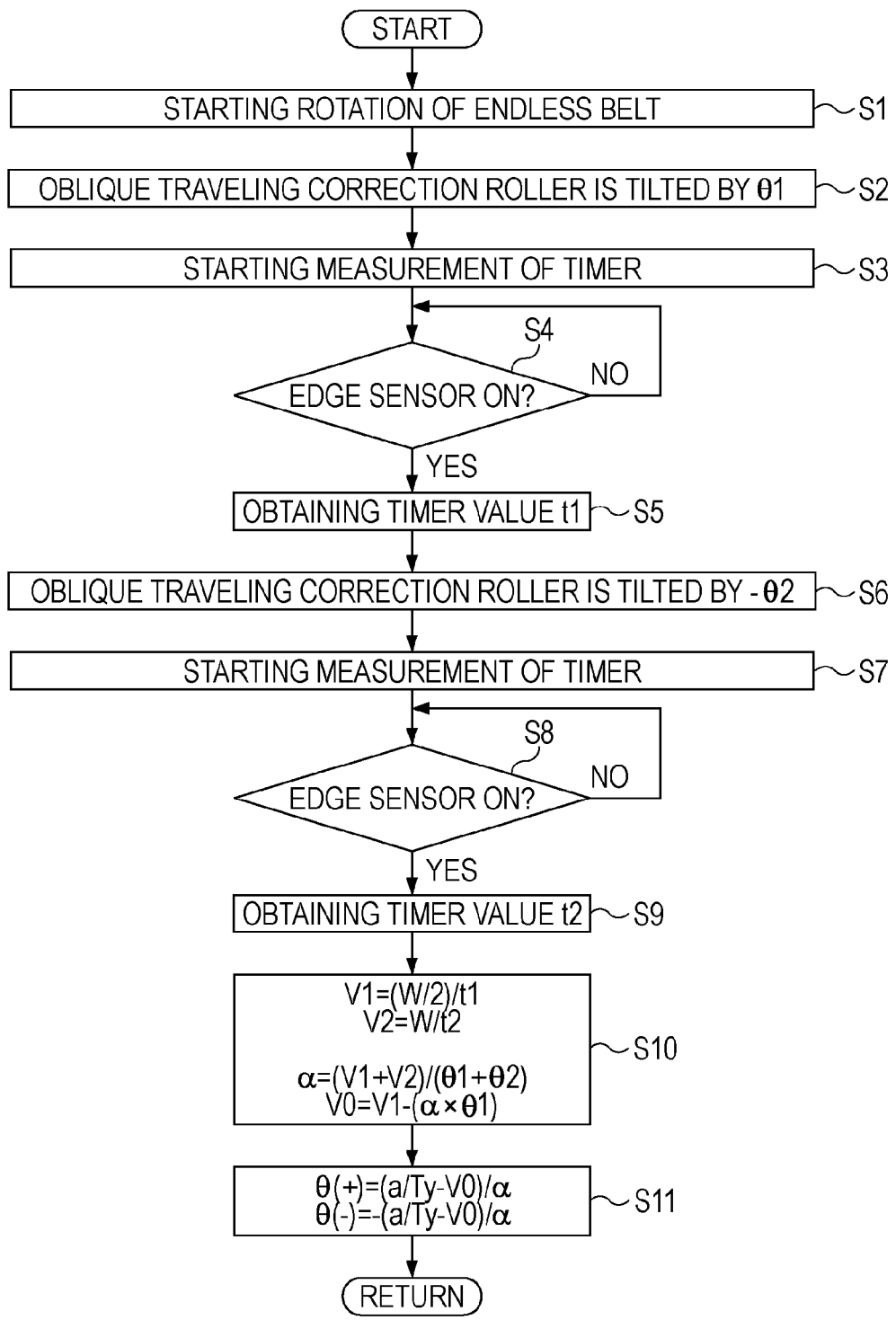
FIG. 3 is a flowchart illustrating an operation for measuring an oblique traveling speed of the belt transport device according to the invention.
Figure 4:
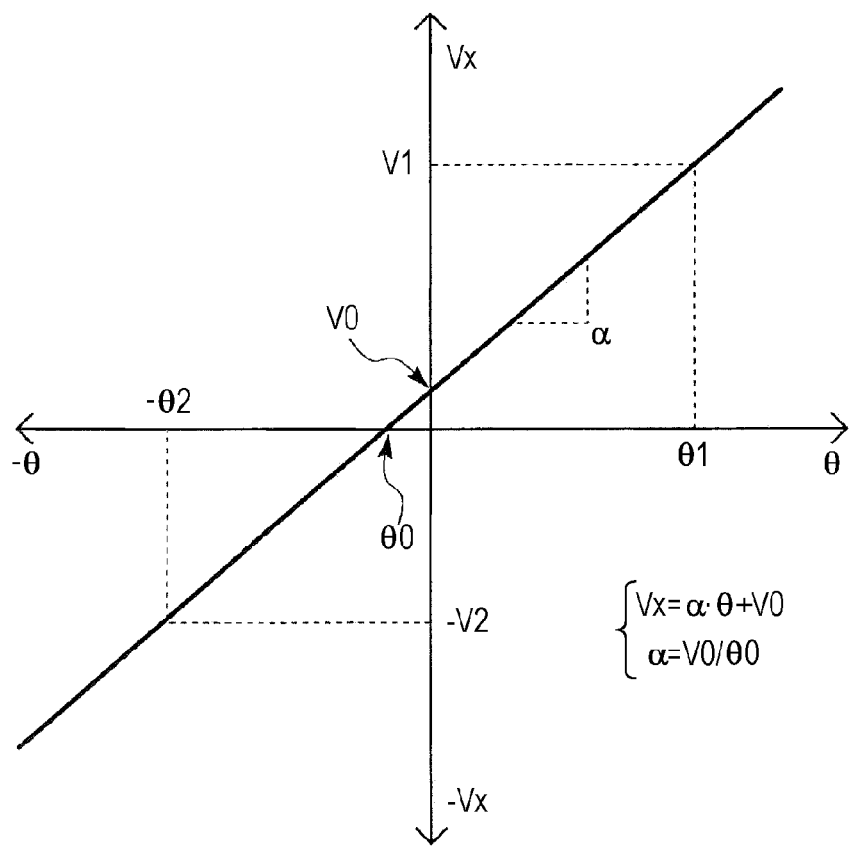
FIG. 4 is a diagram illustrating a relationship between the oblique traveling speed and the tilt of an oblique traveling correction roller according to the invention.

FIG. 3 is a flowchart illustrating an operation when an oblique traveling speed of the belt transport device according to the invention is measured. FIG. 4 is a diagram illustrating a relationship between the oblique traveling speed and the tilt of the oblique traveling correction roller according to the invention.

Herein, the oblique traveling speed differs from one belt transport device to another in accordance with dimensional accuracy and mounting accuracy of the drive roller and the like. In other words, the oblique traveling speed varies in every belt transport device.

Accordingly, it is necessary to measure an oblique traveling speed for each belt transport device. Hereinafter, the operation when the oblique traveling speed is measured will be described.

In Step S1 illustrated in FIG. 3, the rotation of the endless belt is started. Specifically, the controller 6 drives the transport motor 8. Therefore, the drive roller 7 starts to rotate. Since the drive roller 7 transmits power to the endless belt 10, the endless belt 10 starts to rotate.

Herein, before the rotation of the endless belt 10, the position of the endless belt 10 is required to be adjusted so that the magnetic sensor 14 is opposed to the center of a width W of the magnetic recording layer 11. The reason of this is to provide a reference position. Accordingly, at this time, the right edge sensor 15 and the left edge sensor 16 are in an OFF state.

Then, the process proceeds to Step S2.

In Step S2, the oblique traveling correction roller 18 is tilted by an angle θ1 (arbitrary angle). Specifically, the controller 6 causes the tilting mechanism to tilt the oblique traveling correction roller 18 by the angle θ1 from a state of being not tilted in the width direction B. Then, the process proceeds to Step S3.

In Step S3, time measurement of a timer is started. Specifically, the controller 6 operates the timer to start time measurement from the moment the oblique traveling correction roller 18 is tilted by the angle θ1 in Step S2. Then, the process proceeds to Step S4.

In Step S4, it is determined whether the edge sensors are in an ON state. Specifically, the controller 6 determines whether one of the right edge sensor 15 and the left edge sensor 16 is switched to the ON state. When it is determined that any one of them is switched to the ON state, the process proceeds to Step S5. When it is determined that any of them is not switched to the ON state, the process returns to Step S4. That is, the process does not proceed to Step S5 until one of the right edge sensor 15 and the left edge sensor 16 is switched to the ON state.

In Step S5, a timer value t1 is obtained. Specifically, the controller 6 stops the operation of the timer to obtain the time value t1 from when the timer is operated in Step S3 until when the timer is stopped in Step S5. That is, the time value t1 from when the oblique traveling correction roller 18 is tilted by the angle θ1 until when one of the right edge sensor 15 and the left edge sensor 16 is switched to the ON state is obtained.

Then, the process proceeds to Step S6.

In Step S6, the oblique traveling correction roller 18 is tilted by an angle −θ2 (arbitrary angle). Specifically, the controller 6 returns the oblique traveling correction roller 18 tilted by the angle θ1 to its original state and tilts the oblique traveling correction roller 18 by the angle θ2 in the opposite side of the width direction B. Then, the process proceeds to Step S7.

In Step S7, time measurement of a timer is started. Specifically, the controller 6 operates the timer to start time measurement from the moment the oblique traveling correction roller 18 is tilted by the angle −θ2 in Step S6. Then, the process proceeds to Step S8.

In Step S8, it is determined whether the edge sensors are in an ON state. Specifically, the controller 6 determines whether one of the right edge sensor 15 and the left edge sensor 16 is switched to the ON state. When it is determined that any one of them is switched to the ON state, the process proceeds to Step S9. When it is determined that any of them is not switched to the ON state, the process returns to Step S8. That is, the process does not proceed to Step S9 until one of the right edge sensor 15 and the left edge sensor 16 is switched to the ON state.

Herein, for example, when it is determined that the right edge sensor 15 is switched to the ON state in the above-described Step S4, it is determined that the left edge sensor 16 is switched to the ON state in Step S8. The reason of this is that the direction in which the oblique traveling correction roller 18 is tilted in Step S2 is a direction opposite to the direction in which the oblique traveling correction roller 18 is tilted in Step S6.

Similarly, for example, when it is determined that the left edge sensor 16 is switched to the ON state in Step S4, it is determined that the right edge sensor 15 is switched to the ON state in Step S8.

In Step S9, a timer value t2 is obtained. Specifically, the controller 6 stops the operation of the timer to obtain the time value t2 from when the timer is operated in Step S7 until when the timer is stopped in Step S9. That is, the time value t2 from when the oblique traveling correction roller 18 is tilted by the angle −θ2 until when one of the right edge sensor 15 and the left edge sensor 16 is switched to the ON state is obtained.

Then, the process proceeds to Step S10.

In Step S10, an oblique traveling speed V1 of the endless belt 10 in Steps S2 to S5 and an oblique traveling speed V2 of the endless belt 10 in Steps S6 to S9 are calculated.

A distance by which the magnetic sensor 14 and the magnetic recording layer 11 move in relation to each other in the width direction B in Steps S2 to S5 is half the width W. In addition, time required for the movement is t1. Accordingly, the oblique traveling speed V1 can be obtained by the expression $V1=(W/2)/t1$.

A distance by which the magnetic sensor 14 and the magnetic recording layer 11 move in relation to each other in the width direction B in Steps S6 to S9 is equal to the width W. In addition, time required for the movement is t2. Accordingly, the oblique traveling speed V2 can be obtained by the expression $V2=W/t2$.

As illustrated in FIG. 4, by obtaining the oblique traveling speed V1 and the oblique traveling speed V2 (inverse direction), a relational expression of a linear function between an oblique traveling speed Vx and a tilt angle of the oblique traveling correction roller 18 can be obtained. In other words, the relational expression of the linear function, that is, $Vx=\alpha\cdot\theta+V0$ can be obtained by two points, specifically, a point determined by the oblique traveling speed V1 and the tilt angle θ1 of the oblique traveling correction roller 18 and a point determined by the oblique traveling speed V2 and the tilt angle −θ2 of the oblique traveling correction roller 18 (Vx: oblique traveling speed).

Specifically, the tilt α of the linear function can be obtained by the expression $\alpha=(V1+V2)/(\theta1+\theta2)$. Moreover, the expression $V0=V1-(\alpha\times\theta1)$ can be obtained.

Herein, the oblique traveling speed V0 is an oblique traveling speed in a state in which the oblique traveling correction roller 18 is not tilted. That is, in accordance with the dimensional accuracy and mounting accuracy of the drive roller and the like, the oblique traveling speed varies in every belt transport device. A tilt angle θ0 of the oblique traveling correction roller 18 is a tilt angle when the oblique traveling speed is 0.

Then, the process proceeds to Step S11.

In Step S11, tilt angles θ(+) and θ(−) of the oblique traveling correction roller 18 for making a distance by which the magnetic sensor 14 and the magnetic recording layer 11 move in relation to each other in the width direction B for every revolution of the endless belt 10 equal to a length of a width a (see FIG. 6) of the magnetic sensor 14 are obtained. Then, the measurement sequence for the oblique traveling speed is completed.

Herein, for example, if the tilt angle θ(+) is set as an angle by which the endless belt 10 is slowly displaced in relation to the fixed magnetic sensor 14 to the left that is one side of the width direction B, the tilt angle θ(−) is an angle by which the endless belt 10 is slowly displaced to the right that is the other side of the width direction B. That is, the tilt angle θ(+) is an angle by which the endless belt 10 is displaced in relation to the fixed magnetic sensor 14 to the left of the width direction B by the width a of the magnetic sensor 14 for every revolution of the endless belt 10. The tilt angle θ(−) is an angle by which the endless belt 10 is displaced in relation to the fixed magnetic sensor 14 to the right of the width direction B by the width a of the magnetic sensor 14 for every revolution of the endless belt 10.

From the relational expression of the linear function, it is not always true that absolute values of the tilt angles θ(+) and θ(−) are equal to each other.

Next, a main operation of the belt transport device 3 will be described.

Figure 5:
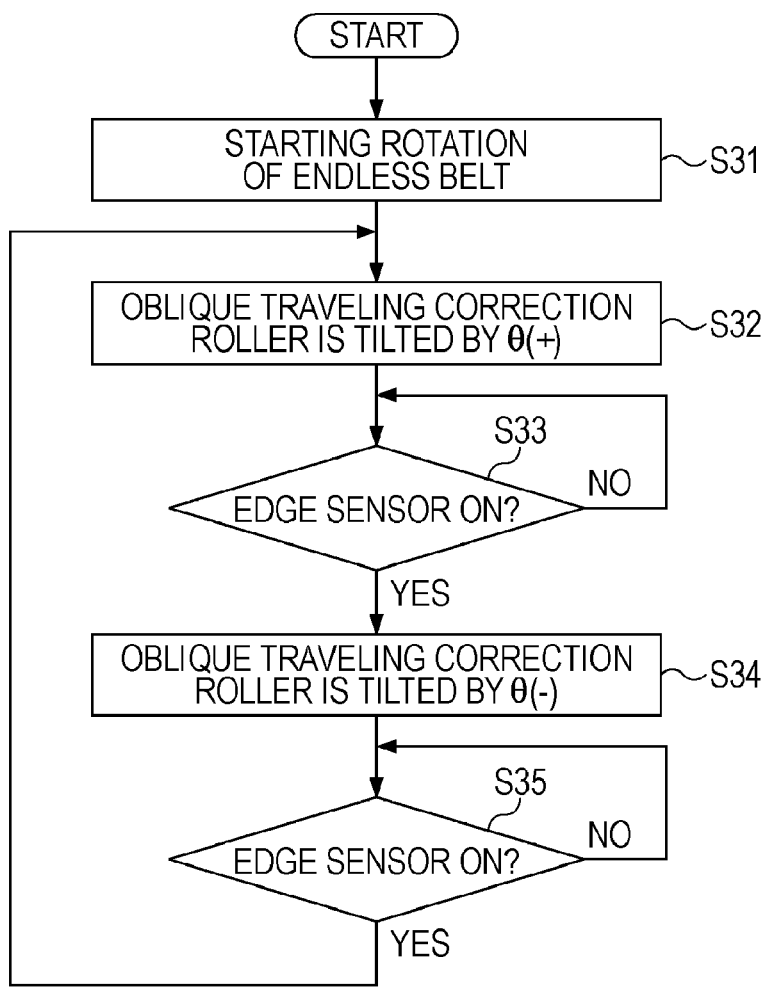
FIG. 5 is a flowchart illustrating an operation of the belt transport device according to the invention.
Figure 6:
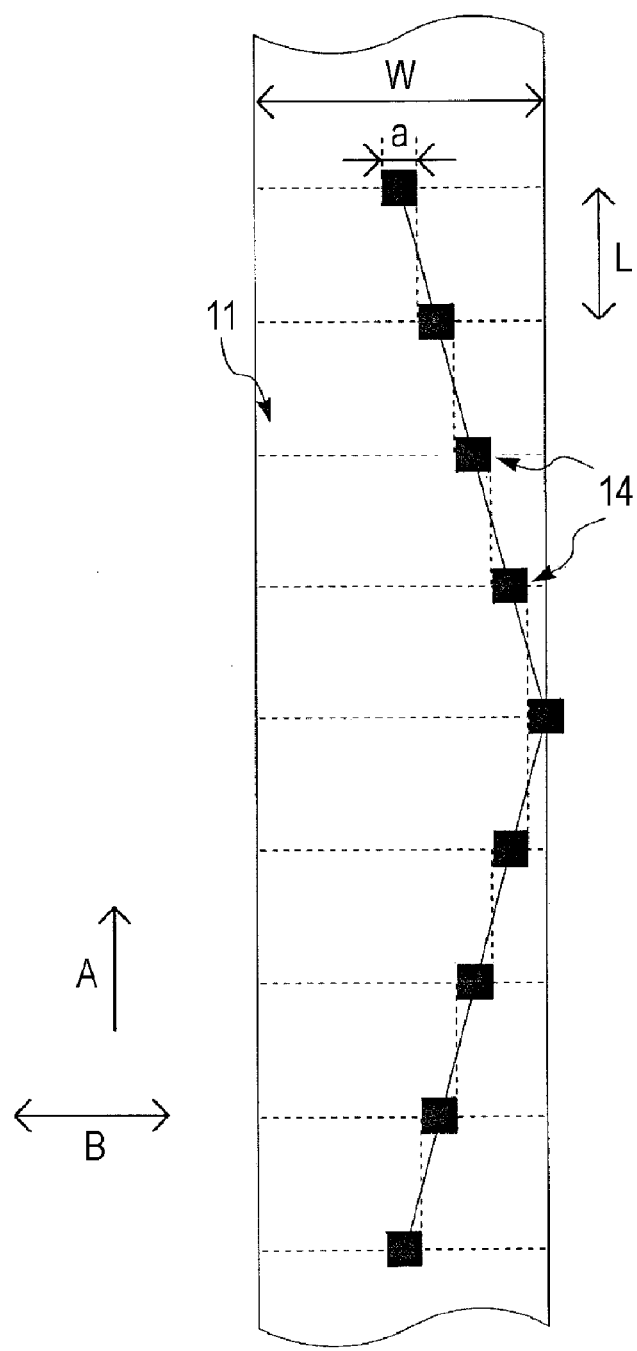
FIG. 6 is a schematic diagram illustrating the operation of the belt transport device according to the invention.

FIG. 5 is a flowchart illustrating an operation of the belt transport device according to the invention and FIG. 6 is a schematic diagram illustrating the operation of the belt transport device according to the invention. In FIG. 6, the reference sign L is a length of one revolution of the endless belt.

As illustrated in FIG. 5, in Step S31, the rotation of the endless belt is started. Specifically, the controller 6 drives the transport motor 8. Therefore, the drive roller 7 starts to rotate. Since the drive roller 7 transmits power to the endless belt 10, the endless belt 10 starts to rotate.

Then, the process proceeds to Step S32.

In Step S32, the oblique traveling correction roller 18 is tilted by the angle θ(+) obtained in the above-described Step S11. Specifically, for example, the controller 6 tilts the oblique traveling correction roller 18 to the left of the width direction B by the angle θ(+) from a state of being not tilted.

At this time, as illustrated in FIG. 6, the magnetic sensor 14 and the magnetic recording layer 11 are relatively displaced by the distance a in the width direction B for every revolution of the endless belt 10. More specifically, by tilting the oblique traveling correction roller 18 to the left by the angle θ(+), the magnetic recording layer 11 of the endless belt 10 is displaced to the left by the distance a for every revolution of the endless belt 10. That is, the magnetic sensor 14 is displaced in relation to the magnetic recording layer 11 to the right by the distance a for every revolution of the endless belt 10.

Then, the process proceeds to Step S33.

In Step S33, it is determined whether the edge sensors are in an ON state. Specifically, the controller 6 determines whether one of the right edge sensor 15 and the left edge sensor 16 is switched to the ON state.

Herein, for example, when the angle θ(+) is on the left side, the endless belt 10 slowly and obliquely travels to the left and thus the left edge sensor 16 is switched to the ON state. At this time, the magnetic sensor 14 is opposed to the right end of the width W of the magnetic recording layer 11 (see FIG. 6).

When it is determined that one of the edge sensors is switched to the ON state, the process proceeds to Step S34. On the other hand, when it is determined that any of the edge sensors is not switched to the ON state, Step S33 is repeated. That is, the process does not proceed to Step S34 until one of the edge sensors is switched to the ON state.

In Step S34, the oblique traveling correction roller 18 is tilted by the angle θ(−) obtained in the above-described Step S11. Specifically, the controller 6 tilts the oblique traveling correction roller 18 to the right of the width direction B by the angle θ(−) from a state of being not tilted.

At this time, for every revolution of the endless belt 10, the magnetic sensor 14 and the magnetic recording layer 11 are relatively displaced by the distance a in the width direction B, specifically, in the direction opposite to the direction in Step S32. More specifically, by tilting the oblique traveling correction roller 18 to the right by the angle θ(−), the magnetic recording layer 11 of the endless belt 10 is displaced to the right by the distance a for every revolution of the endless belt 10. That is, the magnetic sensor 14 is displaced in relation to the magnetic recording layer 11 to the left by the distance a for every revolution of the endless belt 10.

Then, the process proceeds to Step S35.

In Step S35, it is determined whether the edge sensors are in an ON state. Specifically, the controller 6 determines whether one of the right edge sensor 15 and the left edge sensor 16 is switched to the ON state.

Herein, for example, when the angle θ(−) is on the right side, the endless belt 10 slowly and obliquely travels to the right and thus the right edge sensor 15 is switched to the ON state. At this time, the magnetic sensor 14 is opposed to the left end of the width W of the magnetic recording layer 11.

When it is determined that one of the edge sensors is switched to the ON state, the process returns to Step S32. On the other hand, when it is determined that any of the edge sensors is not switched to the ON state, Step S35 is repeated. That is, the process does not return to Step S32 until one of the edge sensors is switched to the ON state.

As described above, for every revolution of the endless belt 10, the magnetic sensor 14 is displaced in relation to the magnetic recording layer 11 in the width direction B by the distance a.

Accordingly, a possibility that the magnetic sensor 14 traces the same point in the magnetic recording layer 11 can be minimized. That is, there is no possibility that a certain point is intensively traced and another certain point is not traced. In other words, the magnetic sensor 14 can come into uniformly contact (trace) with the magnetic recording layer 11.

Figures 7A, 7B, 7C:
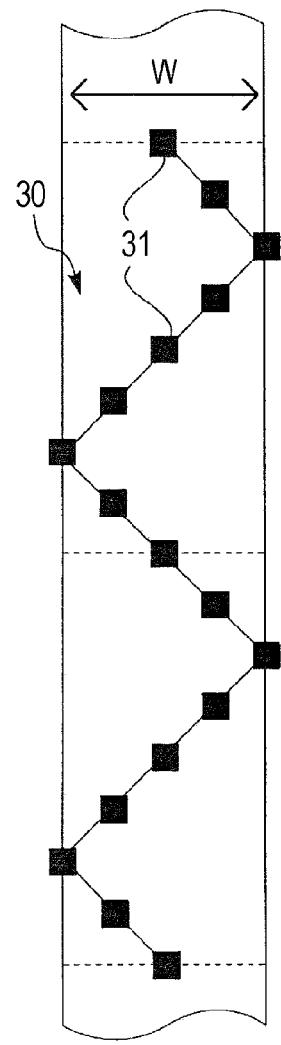
FIGS. 7A to 7C are schematic diagrams illustrating a trajectory of a magnetic sensor of a related art.

As a result, durability of the magnetic recording layer 11 can be greatly improved. That is, as compared to the tracing of the sensor in the related art illustrated in FIGS. 7A to 7C, it is possible to extend the life span of the magnetic recording layer 11.

Moreover, by using the oblique traveling belt correction device 17 provided with the oblique traveling correction roller 18, the above-described advantages can be obtained. That is, there is no need to provide a new unit.

It is most preferable that the magnetic sensor 14 is displaced in relation to the magnetic recording layer 11 in the width direction B by the distance a for every revolution of the endless belt 10 shown in the above-described embodiments. However, the invention is not limited to the above configuration. By the configuration in which the relative positional relationship is displaced so as to satisfy the expression oblique traveling cycle $Tx \neq n \times$ revolution cycle $Ty$ ($n = \ldots, 1/3, 1/2, 1$ and $2$), durability of the magnetic recording layer 11 can be sufficiently improved.

In the above-described embodiments, the magnetic recording layer 11 is displaced in relation to the fixed magnetic sensor 14 in the width direction B. However, a configuration reverse to the above configuration may be employed. In other words, the magnetic sensor 14 may be displaced in the width direction B in relation to the magnetic recording layer 11 which is not displaced in the width direction B.

Moreover, in the above-described embodiments, the used magnetic sensor 14 is a contact magnetic sensor. However, a non-contact optical sensor may be used since a possibility that an error may occur in detection when foreign materials adhere to a detecting side can be minimized.

The belt transport device 3 of this embodiment includes the drive roller 7 which is driven by the transport motor 8 as an example of a power source, the driven roller 9 which is held in a rotatable manner, the endless belt 10 which is wound on the drive roller 7 and the driven roller 9, the magnetic recording layer 11 as an example of a band-like detecting section, which is arranged on the endless belt 10 in the circumferential direction of the endless belt 10, the magnetic sensor 14 as an example of a sensor, which detects the magnetic recording layer 11, the oblique traveling correction roller 18 of the oblique traveling belt correction device 17, which serves as a displacement unit displacing a relative positional relationship between the magnetic recording layer 11 and the magnetic sensor 14 in the width direction B of the endless belt 10, and the controller 6 which controls the oblique traveling correction roller 18 to displace the relative positional relationship so as to satisfy the expression $Tx \neq n \times Ty$ in the range (W) in which the magnetic sensor 14 and the magnetic recording layer 11 are opposed to each other, where $Tx$ is an oblique traveling cycle of the endless belt 10, $Ty$ is a revolution cycle of the endless belt 10 and $n$ is a fraction not more than $1/2$ or an integer of 1 or 2.

Further, in this embodiment, the displacement unit is the tiltable oblique traveling correction roller 18 which corrects the oblique traveling of the endless belt 10 by coming into contact with the face of the endless belt 10.

Furthermore, in this embodiment, for every revolution of the endless belt 10, the controller 6 controls the oblique traveling correction roller 18 so as to displace the relative positional relationship by a distance equal to the width a of the magnetic sensor 14.

A recording device 1 of this embodiment includes the transport unit 2 as a transport section holding and transporting a sheet P which is an example of a recording medium and the recording unit 4 performing a recording operation on the transported sheet P and the transport unit 2 serves as the belt transport device 3.

The belt transport control method of this embodiment includes detecting the oblique traveling speed of the wound endless belt 10 and displacing the relative positional relationship between the magnetic recording layer 11 arranged on the endless belt 10 in the circumferential direction of the endless belt 10 and the magnetic sensor 14 detecting the magnetic recording layer 11 in the width direction B of the endless belt 10. In the displacing, the relative positional relationship is displaced so as to satisfy the expression $Tx \neq n \times Ty$ in the range (W) in which the magnetic sensor 14 and the magnetic recording layer 11 are opposed to each other, where Tx is an oblique traveling cycle of the endless belt 10, Ty is a revolution cycle of the endless belt 10 and n is a fraction not more than ½ or an integer of 1 or 2.

In addition, in this embodiment, in order to determine an angle of the oblique traveling correction roller 18 when the relative positional relationship between the magnetic recording layer 11 which is arranged on the endless belt 10 in the circumferential direction of the endless belt 10 and the magnetic sensor 14 which detects the magnetic recording layer 11 is displaced in the width direction B of the endless belt 10, the belt transport control method includes obtaining (S5) the first time t1 from when the endless belt 10 is positioned at a predetermined position in the width direction B of the endless belt 10 to position the magnetic sensor 14 at the center of the width W of the magnetic recording layer during the driving (S1) of the drive roller 7 on which the endless belt 10 is wound and the oblique traveling correction roller 18 on which the endless belt 10 is wound is tilted (S2, S3) by the first arbitrary angle θ1 from a state of being not tilted until when the right edge sensor 15 (left edge sensor 16) as a first detector which detects a position in the width direction B of the endless belt 10 detects the endless belt 10, obtaining (S8) the second time t2 from when the oblique traveling correction roller is tilted (S6, S7) by the second arbitrary angle θ2 in the opposite direction to the direction of the oblique traveling correction roller tilted by the first arbitrary angle θ1 in the obtaining (S5) of the first time until when the left edge sensor 16 (right edge sensor 15) as a second detector which detects a position in the width direction B of the endless belt 10 detects the endless belt 10 after the obtaining of the first time and calculating (S10, S11) the angles θ(+) and θ(−) of the oblique traveling correction roller 18 which displaces the endless belt 10 by the width a of the magnetic sensor 14 in the width direction B for every revolution of the endless belt 10 on the basis of the first time t1 obtained in the obtaining (S5) of the first time, a first distance W/2 by which the endless belt 10 moves in the width direction B at the first time t1, the second time t2 obtained in the obtaining (S8) of the second time, the width W of the magnetic recording layer 11 that is a second distance by which the endless belt 10 moves in the width direction B at the second time t2, and the width a of the magnetic sensor 14.

It is obvious that the invention is not limited to the above-described embodiments and that various changes and modifications may be made without departing from the spirit and scope of the invention described and claimed herein.

What is claimed is:

1. A belt transport device comprising:
a drive roller which is driven by a power source;
a driven roller which is held in a rotatable manner;
an endless belt which is wound on the drive roller and the driven roller;
a band-like detecting section which is arranged on the endless belt in a circumferential direction of the endless belt;
a sensor which detects the band-like detecting section;
a displacement unit which displaces a relative positional relationship between the band-like detecting section and the sensor in a width direction of the endless belt; and
a controller which controls the displacement unit to displace the relative positional relationship so as to satisfy the expression $Tx \neq n \times Ty$ in the range in which the band-like detecting section and the sensor are opposed to each other, where Tx is an oblique traveling cycle of the endless belt, Ty is a revolution cycle of the endless belt and n is a fraction not more than ½ or an integer of 1 or 2.

2. The belt transport device according to claim 1, wherein the controller controls the displacement unit so as to displace the relative positional relationship by a distance equal to a width of the sensor for every revolution of the endless belt.

* * * * *